Feb. 19, 1924.  1,484,595
A. WATERMAN
DEMONSTRATING DEVICE
Filed May 1, 1922  2 Sheets-Sheet 1

INVENTOR
Arthur Waterman
BY
ATTORNEYS

Feb. 19, 1924.

A. WATERMAN

DEMONSTRATING DEVICE

Filed May 1, 1922

INVENTOR
Arthur Waterman
BY
ATTORNEYS

Patented Feb. 19, 1924.

1,484,595

UNITED STATES PATENT OFFICE.

ARTHUR WATERMAN, OF EAST ORANGE, NEW JERSEY, ASSIGNOR TO EDWARD V. HARTFORD, INC., OF NEW YORK, N. Y., A CORPORATION OF NEW YORK.

DEMONSTRATING DEVICE.

Application filed May 1, 1922. Serial No. 557,809.

*To all whom it may concern:*

Be it known that I, ARTHUR WATERMAN, a subject of the King of Great Brtiain and Ireland, and declarant of intention to become a citizen of the United States, residing at East Orange, county of Essex, and State of New Jersey, have invented a certain new and useful Improvement in Demonstrating Devices, of which the following is a specification.

The present invention relates generally to improvements in demonstrating devices, and is especially directed to an apparatus for demonstrating the method of operation of shock absorbing devices for motor vehicles and the like.

It is well known that various devices are employed to show the method of mounting or attaching shock absorbing devices to vehicles and the manner in which they operate to control the vibrations of the vehicle springs so as to absorb or dissipate the same and prevent the transmission of road shocks or jars to the occupants of the vehicle. These demonstrating devices are frequently used in conjunction with full size structures which it is desired to demonstrate, or with miniatures thereof which are generally made to scale.

The general object of the present invention is to provide a demonstrating device of the aforesaid character which may be economically produced and which will enable an observer to obtain an accurate understanding of the construction and operation of the devices which are being demonstrated.

Another object of my invention is to provide means which will conform to the action of the vehicle suspension under various conditions approximating actual road conditions, when capable of free or unrestrained vibration and when controlled by a so-called anti-vibration device or shock absorber.

My invention further comprehends a demonstration device as aforesaid which may be manually operated to produce vibration of the means corresponding to the vehicle suspension at the will of the operator, either under the control of the shock absorbing or anti-vibration device or without such control, so that comparisons between the unrestrained movement and the control movement of such means may be quickly made to determine the effectiveness of the controlling medium.

Other objects and advantages of my invention will be manifest as the description proceeds, and I would have it understood that I reserve unto myself all rights to the full range of equivalents both in structure and use of which I may be entitled under my invention in its broadest aspect.

For the purposes of the present disclosure, I have illustrated two embodiments of my invention, but it will be obvious that my invention may take other forms without departing from the spirit and scope thereof.

In the drawings, Figure 1 is a top plan view of a demonstrating apparatus for anti-vibration or shock absorbing devices made in accordance with my invention;

Fig. 3 is a view similar to Fig. 1 showing another form of anti-vibration or shock absorbing device.

Figure 1:
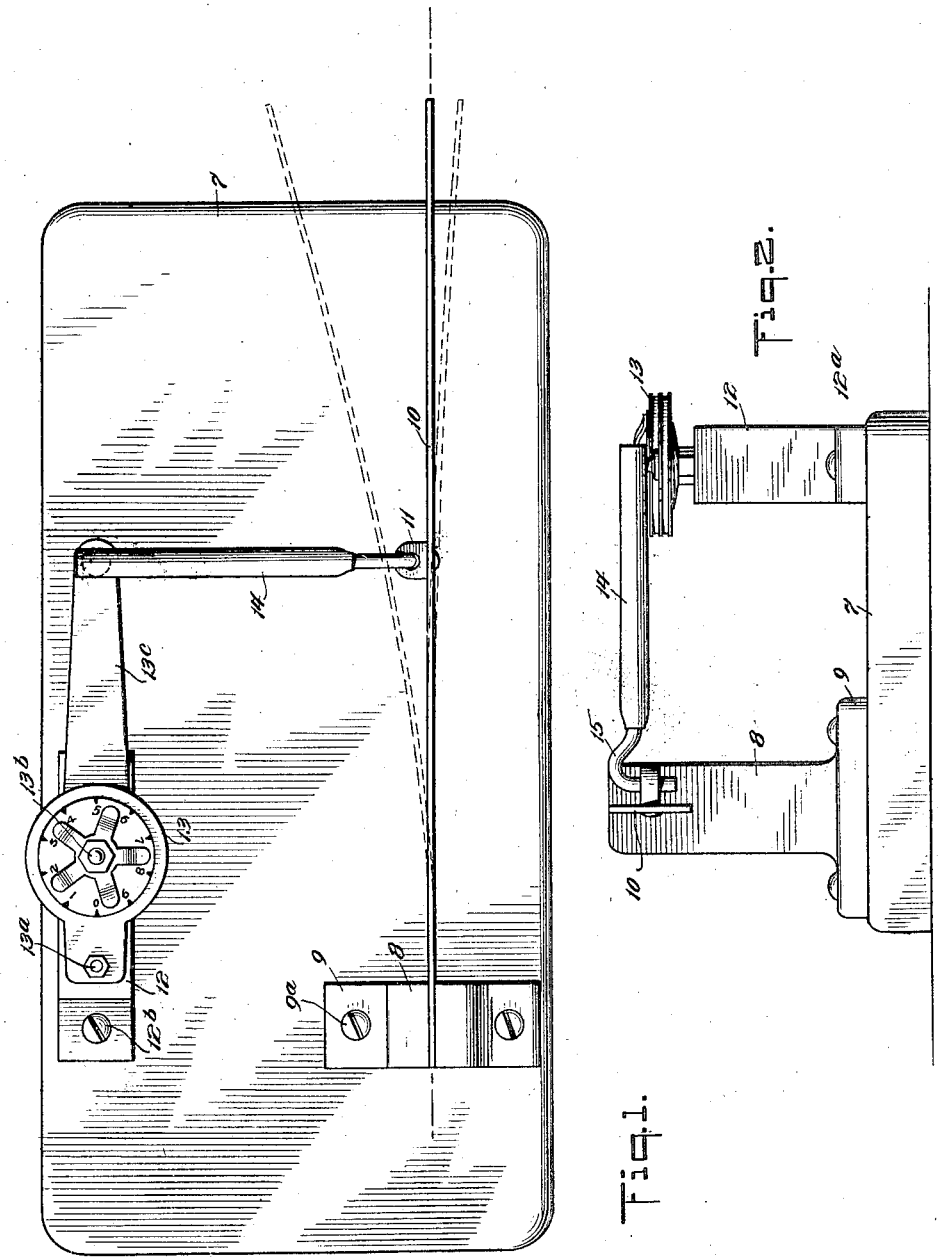
Figure 2:
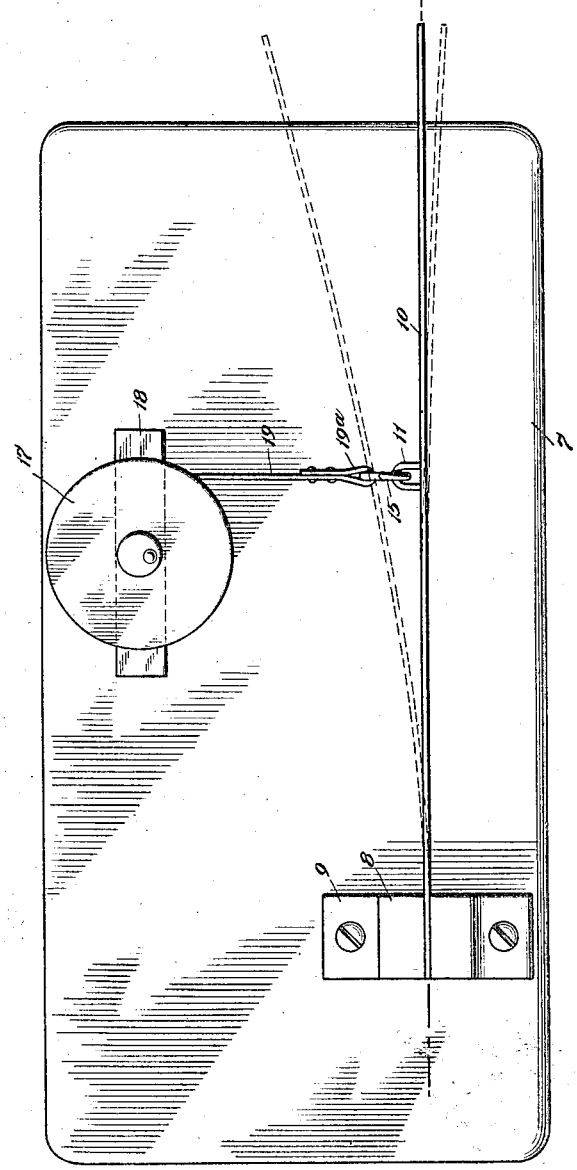
Fig. 2 is an end elevation looking from the right-hand side of Fig. 1.

Referring now to the drawings in detail, in which like characters of reference are employed to designate similar parts throughout the several views, and more especially to Figs. 1 and 2, 7 indicates a base which may be made of wood or may be a casting or stamping as desired. Mounted on the base 7, preferably adjacent to one of the longer sides thereof, is a bracket 8 having a flange 9 at its lower end, whereby said bracket may be rigidly secured to the base by means of screws or the like 9$^a$.

The upper end of the bracket 8 is slotted to receive a strip 10 of resilient material which carries an eye 11 rigidly secured thereto intermediate of its ends. The strip 10 may be positively held in position within the slot provided in the bracket 8 by any suitable means so that it will not be dislodged by the manipulation of said strip in the operation of the demonstrating device as hereinafter described.

Positioned adjacent to the opposite side of the base 7 is a second bracket 12 having a bottom flange 12$^a$ which may be rigidly secured to said base by means of screws or the like 12$^b$. The bracket 12 is preferably of an elongated configuration, the top thereof forming a support for the anti-vibration or shock absorbing device 13 which may be attached thereto by means of the bolts 13ª and 13ᵇ, the top of said bracket 12 being provided with internally threaded apertures for the reception of these bolts.

The shock absorber or anti-vibration device, shown in Figs. 1 and 2, is of the general type illustrated and described in my co-pending application relating to improvements in shock absorbers, filed February 7, 1922, Ser. No. 534,679, and when mounted on the bracket 12 as just described bears the same relation thereto as a shock absorber of a similar type when mounted on a vehicle frame.

As in the construction described in my aforesaid application, the attaching arm 13ᶜ of the shock absorber is adapted for connection with the resilient member 10 by a link 14, preferably of a rigid construction, and which is connected to said arm by a universal joint. The link 14 preferably terminates in a hook 15 which is adapted to engage the aperture in the eye 11, this means of connection between the member 10 and the shock absorber being employed so that the latter may be readily connected to and disconnected from the former.

As heretofore stated, the bracket 12 may be considered as the frame of a vehicle to which the shock absorbing device is attached, while the resilient strip and its supporting bracket 8 may be compared to the vehicle suspension. In order to demonstrate the efficiency of the shock absorbing device in controlling the vibration of the vehicle suspension, the resilient strip 10 may be manually moved from its normal plane to simulate the compression and recoil movements of a vehicle suspension with and without the hook 15 being in engagement with the eye 11 of said strip. When it is desired to illustrate the uncontrolled movement of the vehicle suspension, said hook is disconnected from the eye 11 and the link 14 preferably moved to position to afford ample clearance for the manipulation of the strip 10. As the free end of the strip is grasped and moved to either side of its normal plane, similar to the compression and recoil movements of a vehicle suspension and then released, said strip will have a period of vibration closely approximating that of the movement of an uncontrolled vehicle spring. By this means one is enabled to observe the probable shocks or jars which would be transmitted to a vehicle body by the compression of the vehicle suspension to different degrees. A comparison of the period of vibration of the vehicle spring when uncontrolled and as controlled by a shock absorber may then be readily made by engaging the hook 15 in the eye 11 of the strip 10 and subjecting the strip 10 to distortion by the movement of the free end thereof to the same degree of movement as when uncontrolled. With the shock absorbing device attached to said strip 10, the period of vibration of the latter is reduced to a minimum, the functioning of the shock absorbing device clearly demonstrating the manner in which the compression and recoil movement of the vehicle suspension are controlled.

In Fig. 3 I have shown my demonstrating apparatus as used in demonstrating a shock absorber or anti-vibration device of a different type from that shown in Figs. 1 and 2. In the modified structure the shock absorber 17 is of that general form which embodies a drum, a belt wound thereon and suitable friction elements to control the winding or unwinding of the drum as the case may be. The body of the device is attached to a bracket 18, similar to that shown at 12 in Figs. 1 and 2, the shock absorber or anti-vibration device being adapted for connection to the strip 10 by a yieldable link or strap 19 which is preferably formed with a loop 19ª at its free end to carry a hook 15 for engagement with the eye 11 of the strip 10. The method of operating the modified structure to demonstrate the operation of the form of shock absorber or anti-vibration device embodied therein is similar to that employed in connection with the structure shown in Figs. 1 and 2.

It will be obvious from the foregoing description that my device may be employed to demonstrate full-size shock absorbing devices, in which event the spring element 10 may be actuated by suitable mechanical means. However, it has been found in practice that by making the shock absorbing devices and the spring elements in miniature to scale substantially accurate tests of the action of the shock absorbers in controlling the vibrations of the spring elements may be obtained. Furthermore, where miniature devices are employed one is enabled to ascertain the resistance interposed to the movement of the spring element by disengaging the hook 15 from the eye 11 and a manually operating shock absorber to the various degrees of movement to which it is subjected when connected to the spring element.

While I have described my invention with reference to the specific structures herein shown, it will be evident that various changes in details may be made without departing from the spirit and scope thereof.

I claim:

1. A device for demonstrating the functioning of anti-vibration devices for motor vehicles and the like, comprising a base, a spring and a support therefor, the spring and support being so associated that one end of the spring may vibrate freely, and means for supporting an anti-vibration device for connection to said spring whereby the vibration of the spring may be controlled.

2. A device for demonstrating the functioning of anti-vibration devices for motor vehicles and the like, comprising a base, a bracket secured thereto, a spring element supported at one end within said bracket, a second bracket adapted to support an anti-vibration device, and means carried by said spring element for connecting a movable part of a shock absorber thereto.

3. In a device for demonstrating the functioning of anti-vibration devices for motor vehicles and the like, the combination of a base, a bracket secured thereto, a spring element rigidly supported at one end within said bracket, a second bracket located in a plane parallel to the first bracket, an anti-vibration device mounted on said second bracket, and means for detachably connecting said anti-vibration device to said spring element.

4. A device for demonstrating the functioning of anti-vibration devices for motor vehicles and the like, comprising a base, a bracket secured thereto, a spring element rigidly mounted at one end within said bracket, a second bracket located on said base in a plane parallel to said first bracket, a shock absorber mounted thereon, and means for detachably connecting said shock absorber to said spring element, said latter means including an eye located intermediate of the ends of said element.

5. A device for demonstrating the functioning of anti-vibration devices for motor vehicles embodying a base, an upright bracket secured thereto and provided with a slot in its upper end, a strip of resilient material having one end rigidly secured within the slot in said bracket, a second bracket located on said base in a plane parallel to said first bracket, an anti-vibration device mounted thereon, and means for detachably connecting said device to said resilient strip, said means including an eye carried by said strip intermediate of the ends thereof.

ARTHUR WATERMAN